April 3, 1956  L. H. FLORA  2,740,179
RESILIENT STUD CLIP OR FASTENER
Filed Sept. 20, 1954
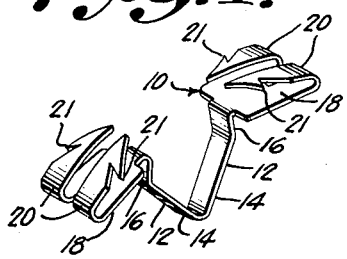
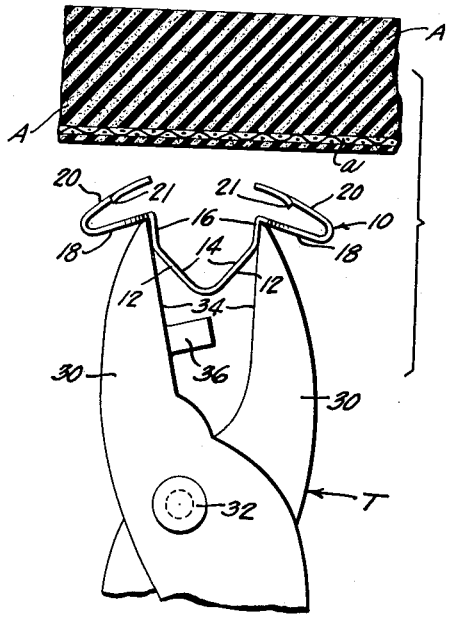
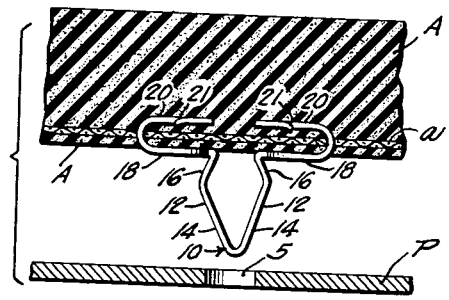
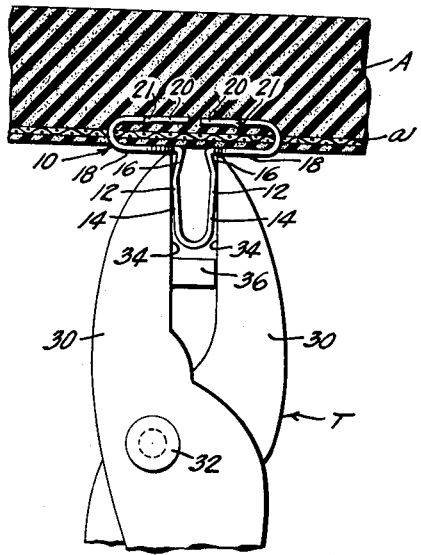
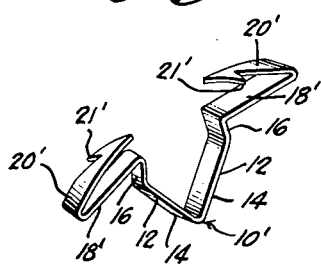
INVENTOR
LAURENCE H. FLORA
BY *H. G. Lombard*
ATTORNEY

United States Patent Office 2,740,179
Patented Apr. 3, 1956

2,740,179

RESILIENT STUD CLIP OR FASTENER

Laurence H. Flora, Cleveland, Ohio, assignor to Tinnerman Products, Inc., Cleveland, Ohio, a corporation of Ohio Application September 20, 1954, Serial No. 456,910

3 Claims. (Cl. 24—213)

This invention relates in general to clips or fasteners, and is directed, more particularly, to such fastening devices which comprise an attaching portion adapted to be connected to an article or object to be secured and another portion defining a projecting shank which is receivable in an opening in a support to secure the article or object in assembled relation on the support.

A primary object of the invention is to provide a clip or fastener of this character which is prepared in a special preliminary shape with integral attaching means adapted for connection to the article to be secured as the clip or fastener is biased from its preliminary shape into a predetermined operative formation in attached position on the article.

Another object of the invention is to provide a clip or fastener of the kind described which is prepared in an initial or preliminary bendable condition together with an integral clinching means adapted to be connected to the article as the clip or fastener is bent into its operative formation in attached position on the article.

A further object of the invention is to provide an improved clip or fastener, as aforesaid, which is formed in a highly simplified construction from a single strip of metal that is bent to define a pair of spaced shank portions and head portions provided with clinching means, and with said clip or fastener prepared in a special preliminary shape by which said clinching means are adapted to be connected to an article to be secured as the clip or fastener is biased from its preliminary shape into a predetermined operative formation in attached position on said article.

Another object of the invention is to provide a clip or fastener in accordance with the foregoing comprising a single strip of metal that is bent to define a pair of spaced shank portions and head portions carrying clinching means extending inwardly toward each other, and with said clip or fastener prepared in a special preliminary shape by which said inwardly directed clinching means are adapted to be connected to an article to be secured as said shank portions are bent from their initial condition in the preliminary shape of the fastener into a projecting predetermined shank formation in the attached position of the clip or fastener on the article to be secured.

A further object of the invention is to provide a special tool for use with a clip or fastener, such as described, in which the tool comprises a pair of spaced jaws adapted to fit over the spaced shank portions of the clip or fastener in the preliminary shape thereof, and thereupon bend said spaced shank portions from their preliminary shape into a predetermined shank formation as the clinching means are embedded in connected relation with the article to be secured.

Further objects and advantages, and other new and useful features in the construction, arrangement and general combination of elements of the improved clips or fasteners of the invention, and the tool for applying the same, will be readily apparent as the following description proceeds with reference to the accompanying drawings, for purposes of illustration but not of limitation, in which like reference characters designate like parts throughout, and in which:

Fig. 1 is a perspective view of one form of clip or fastener in accordance with the invention, and shows the same as prepared in its initial preliminary shape for attachment to an article to be secured;

Fig. 2 shows the clip or fastener in edge elevation in its preliminary form with a tool fitted onto the shank portions thereof in the procedure for attaching the clip or fastener to the article to be secured;

Fig. 3 is a view similar to Fig. 2 showing the tool as actuated to attach the clip or fastener to the article to be secured;

Fig. 4 is a vertical sectional view showing the clip or fastener as fully attached to the article and with the shank thereof in predetermined operative formation for fastening engagement in a panel opening; and, Fig. 5 is a vertical sectional view similar to Fig. 4 showing the clip or fastener as applied to fastening engagement in the panel opening and securing the article on the supporting panel in a completed assembly.

Fig. 6 is a perspective view showing another form of clip or fastener in accordance with the invention.

Referring now, more particularly, to the drawings, there is shown in Fig. 1 one form of clip or fastener in accordance with the invention which is employed as shown in Fig. 5 in a typical fastening assembly for securing any suitable object or article of manufacture A to a supporting part such as a panel P.

The article A to be secured may be made of any suitable relatively soft or porous material such as sponge rubber or a composition thereof provided in a pad or strip for any desired purpose. In the present example, the article A is provided in a strip-like formation for use as weatherstripping in automobile doors, refrigerators, sealed cabinet structures and similar assemblies. The article A may, otherwise, be provided in any form for any required purpose, and when employed as weatherstripping, or the like, is preferably formed with a fine wire mesh $a$, or like material, which is woven or molded therein adjacent to and substantially parallel with the bottom surface of said article A to add stiffness and rigidity thereto.

The supporting part P may be of any suitable material such as sheet metal, wood, fiber board, or the like; however, inasmuch as the invention is employed mainly in metallic structures, the supporting part P is usually in the form of a metallic panel or plate-like member provided with the required openings 5 for receiving the shanks of the clips or fasteners to be employed for retaining the article A in secured position on said supporting part P. The openings 5 may be of any suitable outline but preferably are provided as ordinary circular openings formed by a simple punching or drilling operation.

In general, clips or fasteners in accordance with the invention are prepared substantially as shown in Fig. 1 in a preliminary shape by which clinching means on the head or attaching portions thereof may be applied to the article A to be secured, as illustrated in Figs. 2 and 3, to attach the clip to said article A as shown in Fig. 4, with the shank portion of the clip in a predetermined operative formation adapted to be readily secured in the panel opening 5 as shown in Fig. 5.

The clips or fasteners are provided from relatively small and inexpensive blanks of sheet metal which are readily obtained from standard strip stock with relatively little loss or waste of material. Any suitable sheet metal may be employed but preferably that of a spring metal nature such as malleable spring metal or cold rolled steel having spring-like characteristics.

The clip or fastener 10 shown in Fig. 1, is provided from a sheet metal blank having an intermediate strip portion between wider portions at the ends of said blank. The intermediate strip portion is bent to provide a pair of spaced resilient shank portions 12 integrally united at the leading end of the clip in a pilot which is much smaller than the size of the panel opening 5 so as to be readily received therein. The resilient shank portions 12 comprise guide surfaces 14 diverging to a normal spacing considerably greater than the width of the panel opening 5 and merge with inwardly bent portions forming outwardly inclined cam shoulders 16 adjacent the wider head portions 18.

The head portions 18 extend from said cam shoulders 16 outwardly in opposite directions, and said cam shoulders 16 are spaced below said head portions 18 a distance approximating the thickness of the panel P adjacent the panel opening 5 so as to cooperate with said head portions 18 in engaging opposite surfaces of marginal portions of the panel opening 5 to retain the clip 10 in secured position in said panel opening 5 against displacement in either direction. Preferably, said shoulders 16 are formed as inclined cam shoulders, as shown, which are capable of effective engagement in similar openings in panels of different thicknesses and, otherwise, are adapted to compensate for possible irregularities and manufacturing variations in the thickness of the marginal portions of the panel adjacent said opening 5. When a pronounced positive lock is desired of the shoulders 16 as secured in the panel opening 5, said shoulders 16 are provided as sharp abutments adapted to engage substantial portions of the inner panel surfaces adjacent the panel opening 5.

The head portions 18 extend into outwardly return bent portions which are suitably spaced from said head portions 18 and bifurcated to define a pair of spaced prongs 20 carried by each head portion 18. The pairs of prongs 20 extend inwardly toward each other and are formed with any suitable anchoring elements such as barbs 21 which preferably are provided by notches on the outer edges of said prongs 20 adjacent the pointed ends thereof.

In the preliminary shape of the clip or fastener 10, as shown in Fig. 1, the shank portions 12 are suitably expanded to dispose the prongs 20 in an upwardly inclined relation by which the points of said prongs 20 are exposed and positioned to pierce and become embedded in the soft rubber weatherstripping A or similar material, Fig. 2, as the shank portions 12 of the clip are compressed toward each other as seen in Fig. 3. Preferably the clip 10 is applied to attached position on the part A by a suitable tool comprising a pair of relatively movable jaws adapted to fit over the shank portions 12 of the clip and bend the same from the preliminary shape seen in Fig. 2 to substantially that shown in Fig. 3.

In the present example, such a tool T is shown provided in the form of a pair of long-nosed pliers comprising body members 30 pivotally connected by a pivot pin 32 and defining a pair of inner jaws 34 adapted to fit over and engage the shank portions 12 of the clip 10 substantially as shown in Fig. 2. The jaws 34 of the tool T are of such length as to receive fully the shank portions 12 of the clip and to accommodate a lug 36 on one of said jaws with suitable clearance from the leading end of said clip 10 when positioned between said jaws as shown in Fig. 2. The lug 36 may be provided on its associated jaw 34 in any suitable manner and defines a stop adapted to engage the other jaw 34 to limit the inward movement of said jaws 34 toward each other, as shown in Fig. 3, so that in the application of the clip 10 to its attached position on the article A, the shank portions 12 of the clip are compressed only to the extent necessary for the clip 10 to assume its proper and predetermined operative formation. In an alternate construction, smaller lugs may be provided on each of said jaws 34 in position to abut each other and thereby limit the inward movement of said jaws 34 toward each other in substantially the same manner. The arrangement, otherwise, is such that the jaws 34 of the tool T have a predetermined spacing in substantially parallel relation at the limit of their movement inwardly toward each other, as seen in Fig. 3, and when opened, the ends of said jaws 34 have a slightly outward inclination corresponding to the disposition of the shoulders 16 on the shank portions 12 in order to snugly engage said shoulders 16 while abutting the adjacent head portions 18 of the clip, substantially as shown in Fig. 2.

In the use of the tool T to apply a clip 10 to attached position on the soft rubber weatherstripping or similar article A, the clip 10 in its preliminary shape, is fitted between the open jaws 34 of the clip 10, the prongs 20 In such preliminary shape of the clip 10, the prongs 20 extend in a materially spaced upwardly inclined relation in which the points thereof are exposed and thereby adapted for biting readily into the article A. Accordingly, in the initial step for attaching the clip 10, the tool T is used to push the prongs 20 directly against the article A, whereupon said prongs 20 readily pierce and cut into said part A until the penetration thereof is limited by the contact of the head portions 18 of the clip with adjacent undersurface of said article A. The jaws 34 of the tool T are then closed such that the prongs 20 move inwardly toward each other and become completely embedded in the article A as seen in Fig. 3. The inward movement of the jaws 34 is limited by the stop 36, as aforesaid, and preferably this inward movement of the jaws 34 is such as to compress the shank portions 12 to a predetermined spacing slightly less than the normal spacing of said shank portions 12 in the operative formation of the clip. Thus, when the jaws 34 are closed to the limit of their inward movement, the resilient shank portions 12 are compressed and somewhat flattened as seen in Fig. 3, while the extremities of the prongs 20 have only a slight spacing therebetween.

When the tool T is removed from the attached clip 10, the compressed shank portions 12 thereof automatically expand to a much wider spacing under their inherent resiliency as seen in Fig. 4, in the normal untensioned condition of the clip as fully attached to the article A. In this relation, the shank of the clip 10 assumes its operative substantially diamond-shaped formation for securing in the panel opening 5, with the shank portions 12 in a normal spacing considerably greater than the width of said panel opening 5 and the extremities of the prongs 20 in a proportionately wider spacing, as seen in Fig. 4, and with the barbs 21 anchoring said prongs 20 against reverse movement in the direction for loosening or removal from such fully attached position on the weatherstripping A or other article.

In completing a fastening assembly in accordance with the invention, the required number of clips or fasteners 10 is attached in substantially the manner aforesaid, in suitably spaced relation on the undersurface of the weatherstripping A or similar article of soft rubber, or the like. The panel P or other supporting part is provided with a suitable number of openings 5 in a spacing corresponding to the spacing of the clips 10 attached to said article A. In securing the shank of a clip 10 in its associated opening 5, the leading end of the clip is readily received in the said opening 5 inasmuch as it is of a much smaller size for this purpose, as aforesaid. Pressure on the article A over the head of the clip 10 moves the spaced resilient shank portions 12 thereof axially into said opening 5 in a manner whereby the diverging guide surfaces 14 have a gradual camming action against the adjacent walls of the panel opening 5 which forces said shank portions 12 to flex and yield inwardly as necessary to permit the shoulders 16 to snap through said panel opening 5 and engage the lower corner edges thereof at the inner surface of said panel P in the secured position of the clip 10 in said panel opening 5 as shown in Fig. 5.

In the secured position of the clip in the opening 5, the shank portions 12 thereof are slightly compressed and exert an expansive force in attempting to assume their initial untensioned condition, thereby causing the cam shoulders 16 to ride on the lower corner edges of the panel opening 5 to the point of most effective engagement therewith. The cam shoulders 16 are thus seated in the panel opening 5 in engagement with marginal portions of the panel opening at the undersurface of the panel P with the head portions 18 bearing on the upper surface of said panel P, and accordingly, said shoulders 16 and head portions 18 cooperate in engaging opposite surfaces of the panel P adjacent the panel opening 5 to prevent axial displacement of the clip 10 in either direction from secured position in said panel opening 5.

Fig. 6 shows another form of clip or fastener 10′ in accordance with the invention, which is generally similar in construction, application and use to the clip or fastener described with reference to Figs. 1–5, inclusive. The clip or fastener of Fig. 6, however, is considerably cheaper in that it may be produced at relatively lower cost from a blank obtained from standard sheet metal strip stock of uniform width without loss or waste of material whatsoever. The clip 10′ is formed from such a blank of uniform width by bending the intermediate portion thereof to provide the same general type of shank comprising spaced shank portions 12 having guide surfaces 14 merging into inwardly bent portions providing the outwardly inclined cam shoulders 16. The ends of the strip are bent to provide the similar head portions 18′ extending outwardly in opposite directions together with return bent portions defining prongs 20′ formed with suitable barbs 21′ which preferably are provided by notched portions on the diagonally opposite edges of said prongs 20′ substantially as shown in Fig. 6.

The clip or fastener in either form preferably is constructed of relatively thin sheet metal, the thickness of which is selected according to service requirements and the predetermined size of the article to be secured. The clip or fastener is most effective when provided of spring metal suitably tempered and otherwise treated to give the desired toughness and hardness, particularly in the case of devices which are intended for heavy duty applications. A cheap and highly satisfactory clip or fastener may be provided from cold rolled metal such as cold rolled steel which is untempered but of a spring metal nature and capable of providing an effective and reliable securing device as and for the purposes described.

While the invention has been described in detail with specific examples, such examples are intended as illustrations only inasmuch as the invention fully contemplates various modifications which may be provided without departing from the spirit and scope of the invention.

What is claimed is:

1. A snap stud clip provided in a preliminary shape for bending into final form in the attachment thereof to an article to be secured, said clip comprising a length of sheet metal bent intermediately to provide a pair of spaced shank portions integrally united at the leading end of the clip and head portions at the other end thereof carrying prongs directed inwardly toward each other, said spaced shank portions having an enlarged spacing in said preliminary shape of the clip by which the extremities of said prongs project in inclined relation in position to pierce said article and become embedded therein as said spaced shank portions are bent inwardly into the final predetermined form of shank comprising a snap stud projecting from said article and adapted to be secured in an opening in a supporting part.

2. A snap stud clip provided in a preliminary shape for bending into final form in the attachment thereof to an article to be secured, said clip comprising a length of sheet metal bent intermediately to provide a pair of spaced shank portions integrally united at the leading end of the clip and head portions at the other end thereof extending outwardly from said shank portions in opposite directions, said head portions having return bent portions defining prongs directed inwardly toward each other, said spaced shank portions having an enlarged spacing in said preliminary shape of the clip by which the extremities of said prongs project in inclined relation in position to pierce said article and become embedded therein as said spaced shank portions are bent inwardly into the final predetermined form of shank comprising a snap stud projecting from said article and adapted to be secured in an opening in a supporting part.

3. A snap stud clip provided in a preliminary shape for bending into final form in the attachment thereof to an article to be secured, said clip comprising a length of sheet metal bent intermediately to provide a pair of spaced shank portions integrally united at the leading end of the clip and head portions at the other end thereof extending outwardly from said shank portions in opposite directions, said head portions having bifurcated return bent portions defining pairs of prongs directed inwardly toward each other, and anchoring barbs on said prongs, said spaced shank portions having an enlarged spacing in said preliminary shape of the clip by which the extremities of said pairs of prongs project in inclined relation in position to pierce said article and become embedded therein as said spaced shank portions are bent inwardly into the final predetermined form of shank comprising a snap stud projecting from said article and adapted to be secured in an opening in a supporting part, said barbs anchoring said pairs of prongs against removal when embedded in said article in the attached position of the clip on said article.

References Cited in the file of this patent

UNITED STATES PATENTS

| Number | Name | Date |
|---|---|---|
| 117,883 | Heflebower | Aug. 8, 1871 |
| 139,853 | Hill | Aug. 27, 1872 |
| 148,256 | Stevenson | Mar. 3, 1874 |
| 204,736 | Housum | June 11, 1878 |
| 216,468 | St. Mary | June 10, 1879 |
| 1,399,183 | Bicker | Dec. 6, 1921 |
| 1,512,040 | Reed | Oct. 21, 1924 |
| 2,193,951 | Van Uum | Mar. 1, 1940 |